US008116779B2

(12) United States Patent
Iwamura et al.

(10) Patent No.: US 8,116,779 B2
(45) Date of Patent: Feb. 14, 2012

(54) BASE STATION, MOBILE STATION AND RADIO CHANNEL CONDITION REPORTING METHOD (75) Inventors: Mikio Iwamura, Yokohama (JP);
Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 609 days.

(21) Appl. No.: 12/279,652

(22) PCT Filed: Mar. 19, 2007

(86) PCT No.: PCT/JP2007/055569
§ 371 (c)(1),
(2), (4) Date: Jan. 13, 2009

(87) PCT Pub. No.: WO2007/111184
PCT Pub. Date: Oct. 4, 2007

(65) Prior Publication Data
US 2009/0233612 A1 Sep. 17, 2009

(30) Foreign Application Priority Data
Mar. 20, 2006 (JP) .................. 2006-077819

(51) Int. Cl.
*H04W 72/00* (2009.01)
(52) U.S. Cl. ............ 455/450; 455/464; 455/452.2; 455/509; 455/422.1; 370/329; 370/311; 370/230; 370/442; 370/208
(58) Field of Classification Search .......... 455/450, 455/464, 452.2, 509, 422.1; 370/329, 311, 370/230, 343, 442, 208
See application file for complete search history.

(56) References Cited

U.S. PATENT DOCUMENTS

| 4,852,148 | A | 7/1989 | Shibata et al. | |
|---|---|---|---|---|
| 2004/0047328 | A1* | 3/2004 | Proctor et al. | 370/342 |
| 2006/0023629 | A1* | 2/2006 | Kim et al. | 370/235 |
| 2007/0070894 | A1* | 3/2007 | Wang et al. | 370/230 |
| 2007/0189199 | A1* | 8/2007 | Nishio | 370/328 |
| 2008/0291856 | A1* | 11/2008 | Li et al. | 370/311 |
| 2009/0052405 | A1* | 2/2009 | Ko et al. | 370/335 |

FOREIGN PATENT DOCUMENTS

| JP | 63-272128 A | 11/1988 |
|---|---|---|
| JP | 63-316942 | 12/1988 |
| JP | 2003-158762 A | 5/2003 |

(Continued)

OTHER PUBLICATIONS

Office Action of Japan with Patent Application No. 2006-077819, dated Aug. 2, 2010, with English translation thereof (8 pages).

(Continued)

*Primary Examiner* — Ajit Patel
*Assistant Examiner* — Khai M Nguyen
(74) *Attorney, Agent, or Firm* — Osha • Liang LLP (57) ABSTRACT A base station includes a group determination unit grouping mobile stations residing within a cell and a radio channel condition reception unit receiving information indicative of a radio channel condition transmitted from a mobile station at a transmission timing of the radio channel condition corresponding to a group associated with the mobile station. Each mobile station includes a radio channel condition measurement unit evaluating a radio channel condition, a group determination unit determining a group associated with the mobile station, and a radio channel condition transmission unit transmitting information indicative of the evaluated radio channel condition at a transmission timing of the radio channel condition corresponding to the associated group.

7 Claims, 10 Drawing Sheets

FOREIGN PATENT DOCUMENTS

| | | |
|---|---|---|
| JP | 2004-328239 A | 11/2004 |
| JP | 2005-518113 A | 6/2005 |
| JP | 2006-33865 A | 2/2006 |
| WO | 03/058829 A2 | 7/2003 |
| WO | 2004/077871 A1 | 9/2004 |
| WO | 2005/096522 A1 | 10/2005 |

OTHER PUBLICATIONS

International Search Report w/translation from PCT/JP2007/055569 dated Jul. 3, 2007 (4 pages).

Written Opinion from PCT/JP2007/055569 dated Jul. 3, 2007 (5 pages).

Patent Abstracts of Japan; Publication No. 63-272128 dated Nov. 9, 1988; Oki Electric Industry Co., Ltd. (2 pages).

"Services provided by the physical layer"; 3GPP_TS_25.302, V6.5.0, Sep. 2005, pp. 1-75 (75 pages).

"Physical layer procedures (FDD)"; 3GPP_TS_25.214, V6.7.1; Dec. 2005; pp. 1-60 (60 pages).

"Overall description"; 3GPP_TS_25.308, V6.3.0; Dec. 2004; pp. 1-28 (28 pages).

"Physical Layer Aspects"; 3GPP_TR25.858; V5.0.0; Mar. 2002; pp. 1-31 (31 pages).

Tachikawa, K.; "W-CDMA Mobile Communication System"; Published by Maruzen K.K.; pp. 403-404, Jun. 2001 (5 pages).

* cited by examiner

> THE NUMBER OF GROUPS N
> REPORTING FRAME NUMBER FOR GROUP 1 (EX. VALUE OF SFN mod N)

FIG.9B

> THE NUMBER OF GROUPS N
> THE NUMBER OF FRAMES M (EX. 2, 3, ⋯)
> REPORTING FRAME NUMBER FOR GROUP 1 (EX. VALUE OF SFN mod N)

FIG.9C

> THE NUMBER OF GROUPS N
> REPORTING CYCLE T
> REPORTING FRAME NUMBER FOR GROUP 1 (EX. VALUE OF SFN mod N)

FIG.9D

> THE NUMBER OF GROUPS N
> ENTIRE PATTERN CYCLE T
>> PATTERN START FRAME FOR GROUP 1 (VALUE OF SFN mod N)
>> PATTERN NUMBER FOR GROUP 1
>> PATTERN START FRAME FOR GROUP 2 (EX. OFFSET FROM GROUP 1)
>> PATTERN NUMBER FOR GROUP 2
...
>> PATTERN START FRAME FOR GROUP N (EX. OFFSET FROM GROUP N-1)
>> PATTERN NUMBER FOR GROUP N

FIG.9E

> DEFAULT NUMBER

BASE STATION, MOBILE STATION AND RADIO CHANNEL CONDITION REPORTING METHOD

TECHNICAL FIELD

The present invention relates to base stations, mobile stations and radio channel condition reporting methods.

BACKGROUND ART

In recent radio communication schemes such as HSDPA (High-Speed Downlink Packet Access), some measurements for conditions in downlink radio channels (referred to as CQIs (Channel Quality Indicators) hereinafter), are reported from mobile stations to base stations. For example, see a publication written in Japanese "W-CDMA mobile communication schemes" edited by Keiji Tachikawa, published by Maruzen, pp. 403-404, June 2001.

DISCLOSURE OF INVENTION

Problem to be Solved by the Invention

However, the above-mentioned prior art has some problems as presented below.

Figure 1A:
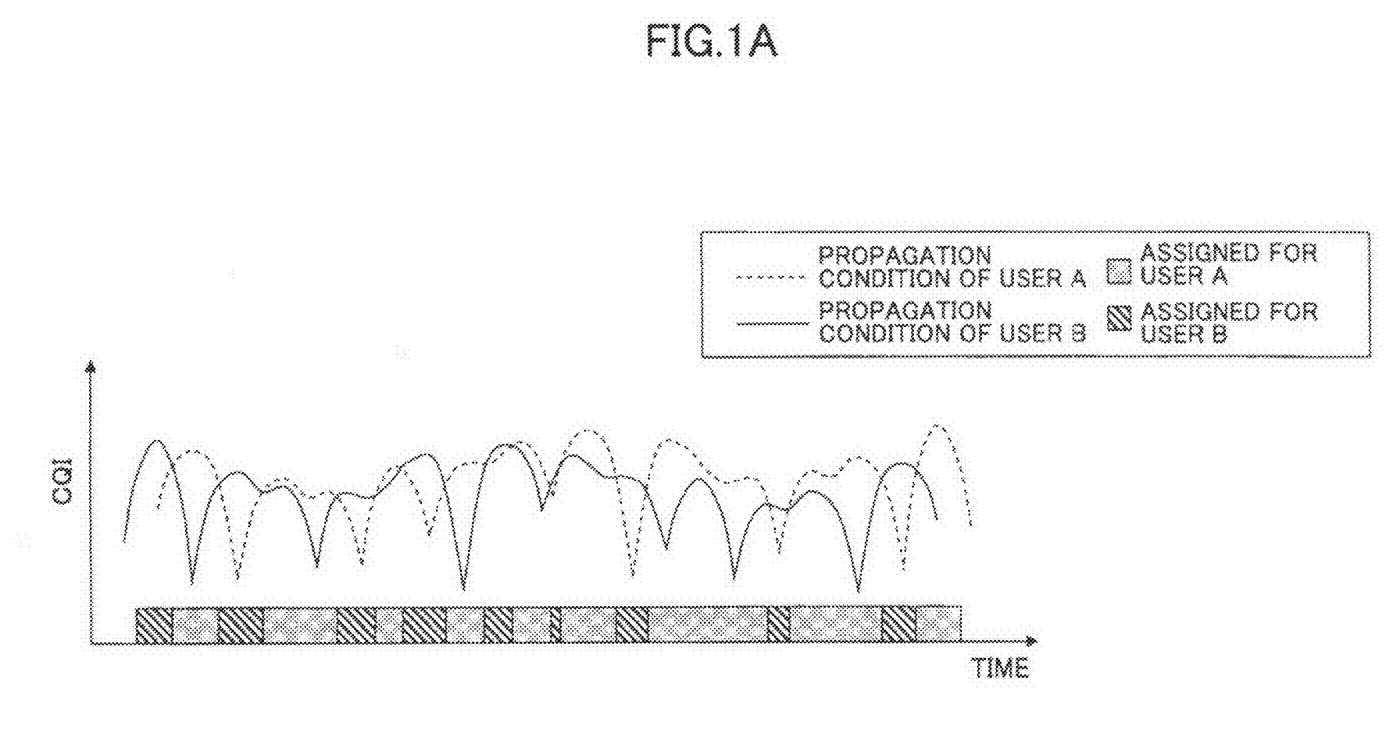
FIG. 1A is a schematic diagram illustrating exemplary scheduling in the temporal direction.

Propagation environments may vary depending on traveling speed of users. Thus, in order to perform link adaptation efficiently and/or enhance the effect of multiuser diversity through scheduling, as illustrated in FIG. 1A, CQIs must be more frequently reported. FIG. 1A shows exemplary scheduling (multiuser diversity) in the temporal direction being a profile for a certain subband. However, a larger amount of reported CQIs may make the traffic capacity of uplinks smaller and/or consume a larger amount of battery energy of mobile stations.

Figure 1B:
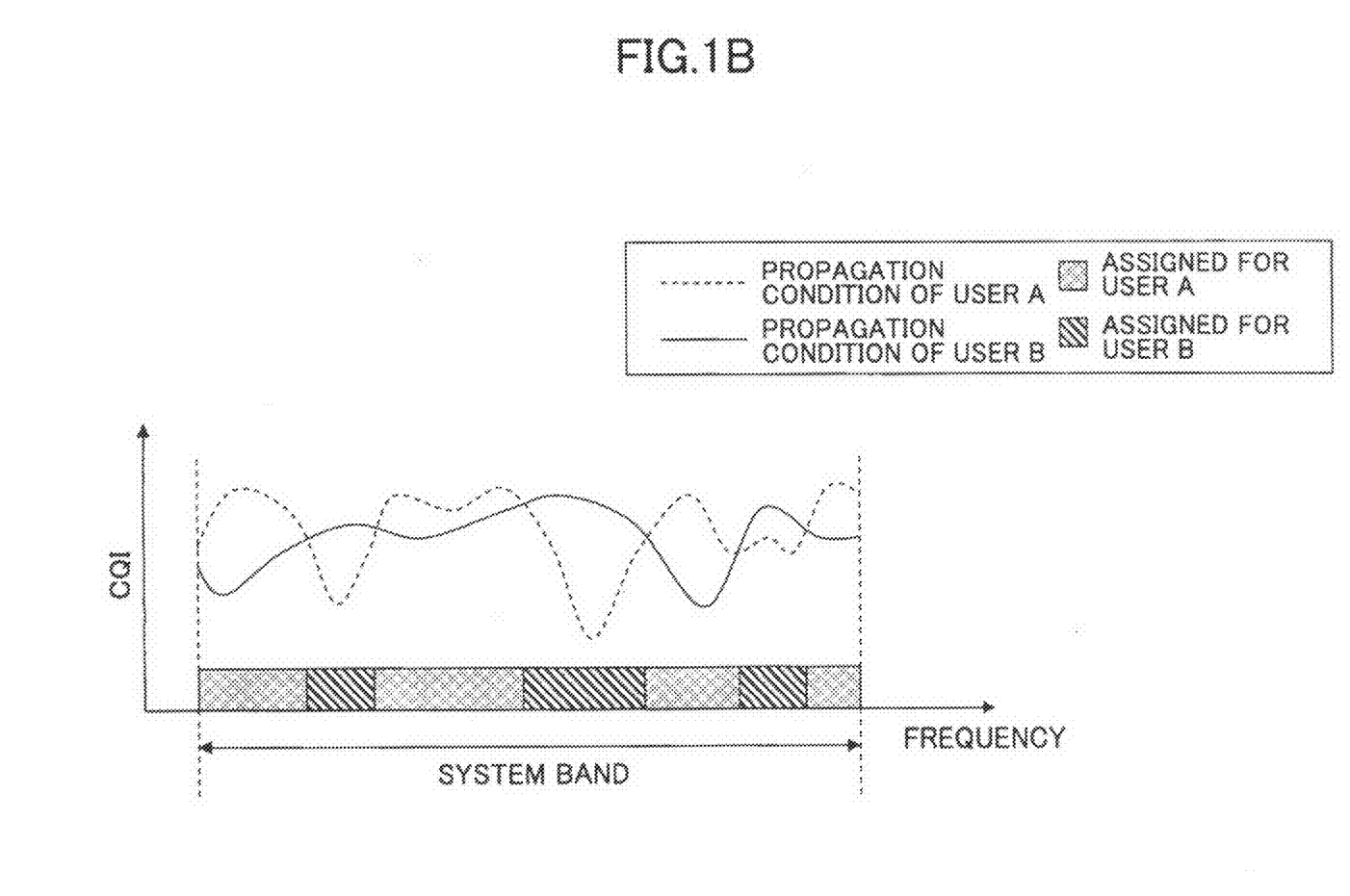
FIG. 1B is a schematic diagram illustrating exemplary scheduling in the frequency direction.

In future mobile communication systems, it is estimated that a wider band may be used for a higher transmission rate, smaller delay and a higher capacity. In cases of systems with wider bands, frequency selective fading may occur, and thus it is advantageous that better frequency bands are selectively used for respective users for efficient transmission, as shown in FIG. 1B. FIG. 1B shows exemplary scheduling (multiuser diversity) in the frequency direction being a profile at a certain frame time. To this end, the entire frequency band for a system is divided into several subbands, and CQIs must be evaluated and reported for each of the subbands.

The CQIs may be reported in various schemes. For example, the numbers of subbands with the three best CQIs and the associated CQI values may be reported. Alternatively, some differences between the average for the entire band and the respective averages for the individual subbands may be reported. Alternatively, some results obtained by encoding with DCT (Discreet Cosine Transform) in the frequency direction may be reported.

Any of the schemes may increase the amount of information required to report the CQIS, which may adversely affect efficient utilization of wide bands. The increase in the information amount for reporting of the CQIs may make the traffic capacity of uplinks smaller and/or consume a larger amount of battery energy in mobile stations.

As understood from the above description, there is a trade-off between efficiency of one link and the amount of feedback information for the other link. Here, it is supposed that the minimum units in the temporal direction and in the frequency direction are defined to be a frame and a subband, respectively, for scheduling and/or link adaptation. In this case, it may be unpractical to report the CQIs for all the subbands for each frame straightforwardly, and the above-mentioned trade-off must be advantageously balanced.

In practice, it may be an effective scheme to report the CQIs for the three best subbands once every few frames. However, if users report various amounts of CQIs at various timings, more radio resources, such as more radio channels, must be provided for the CQI reporting. This is why capacity enough to handle an instantaneous peak amount of information must be reserved. If a large number of users report the CQIs at the same timing, there is a risk that the amount of uplink interference may increase in a burst manner and/or transmission power may increase at the CQI reporting timing to overcome the increased amount of uplink interference.

In addition, in some schemes where multiple users share the same radio resources (radio channels) through packet scheduling such as the HSDPA, as a result of the scheduling based on some rules such as Max C/I or Proportional Fairness (PF), a certain frame may be assigned for transmission by only a portion of the users. In this case, the CQIs reported by the other unassigned users may be wasted. In some schemes where all users report the CQIs at the same timing simultaneously, even if such up-to-date CQIs are reported, the CQIs may not be effectively used for many of the users. Also, scheduling must be performed between reporting timings without reporting of the up-to-date CQIs, and thus the scheduling cannot be based on the up-to-date CQIs. As a result, suitable users cannot be selected, reducing the gain of multiuser diversity. In addition, appropriate link adaptation cannot be performed on users assigned by a scheduler, resulting in less efficient transmission.

Note that the above-mentioned problems may occur for not only the CQI but also other information items reported from mobile stations periodically. For example, these information items may include status information for an uplink transmission buffer in the HSDPA. In the HSDPA, a base station determines which radio resources are assigned for individual mobile stations depending on the buffer status reported from the mobile stations and manages the assignment of radio resources. Similar to the CQI reporting, when users report the status at unspecified various timings, the radio resources required for the reporting may increase and/or the amount of uplink interference and the transmission power may increase and/or vary.

Thus, the present invention addresses the above-mentioned problems. One object of the present invention is to provide a base station, a mobile station and a radio channel condition reporting method enabling a radio channel condition to be reported efficiently.

Means for Solving the Problem

In order to overcome the above-mentioned problems, an embodiment of the present invention relates to a base station, comprising: a group determination unit grouping mobile stations residing within a cell; and a radio channel: condition reception unit receiving information indicative of a radio channel condition transmitted from a mobile station at a transmission timing of the radio channel condition corresponding to a group associated with the mobile station.

According to this embodiment, it is possible to group mobile stations and shift timings of radio channel conditions for the respective groups.

In addition, an embodiment of the present invention relates to a mobile station, comprising: a radio channel condition measurement unit evaluating a radio channel condition; a group determination unit determining a group associated with the mobile station; and a radio channel condition transmission unit transmitting information indicative of the evaluated radio channel condition at a transmission timing of the radio channel condition corresponding to the associated group.

According to this embodiment, it is possible to shift reporting timings of radio channel conditions for the respective groups.

Further, an embodiment of the present invention relates to a radio channel condition reporting method, comprising the steps of: evaluating a radio channel condition; determining a group associated with a mobile station; and transmitting information indicative of the evaluated radio channel condition at a transmission timing of the radio channel condition corresponding to the associated group.

ADVANTAGE OF THE INVENTION

According to the embodiments of the present invention, the base station, mobile station and radio channel condition reporting method can report a radio channel condition efficiently.

LIST OF REFERENCE SYMBOLS

100: base station
200: mobile station

BEST MODE FOR CARRYING OUT THE INVENTION

Hereinafter, embodiments of the present invention will be described with reference to the drawings. Throughout all the drawings for explanation of the embodiments, the same reference signs are designated for the same functions, and duplicated descriptions thereof are omitted.

A mobile communication system according to one embodiment of the present invention is described.

In this embodiment, the mobile communication system includes a base station 100 and a mobile station 200.

In HSDPA, CQI corresponds to $E_c/I_o$ (ratio of reception chip energy to interference power density) for a common pilot channel. In this embodiment, however, the CQI is not limited to it, and indicators for indicating radio channel conditions, such as propagation loss, reception power and signal-to-interference power ratio, are collectively refereed to as the CQI.

Next, the base station 100 according to this embodiment is described.

The base station 100 groups users and reports information indicative of the respective groups to the users. In the mobile stations 200, the groups are associated to radio channel condition reportable timings. Based on the reported information indicative of the group, the mobile station 200 reports the radio channel condition at the timing corresponding to the associated group.

Alternatively, in the base station 100, the respective groups may be associated with the radio channel condition reportable timings, and the information indicative of the radio channel condition reportable timings may be reported to the mobile station 200. In this embodiment, the mobile station 200 reports the radio channel condition at the reported radio channel condition reportable timing.

Figure 2:
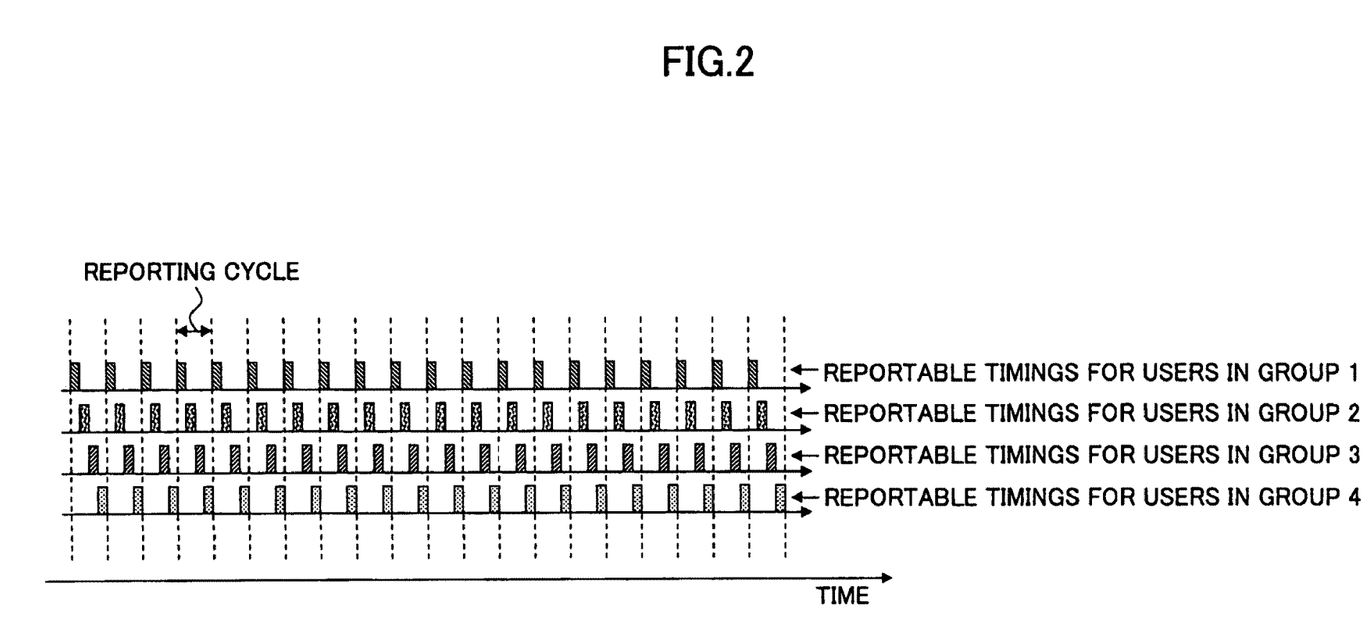
FIG. 2 is a schematic diagram illustrating exemplary reporting timings of radio channel conditions according to one embodiment of the present invention.

For example, as illustrated in FIG. 2, the mobile station 200 reports the CQI, such as the radio channel condition, at the timing corresponding to the group associated with that mobile station 200. Hence, the radio channel condition reportable timings may differ among the respective groups.

For example, users belonging to group 1 report the respective radio channel conditions at reportable timings associated with group 1. Also, users belonging to group 2 report the respective radio channel conditions at reportable timings different from those of group 1. Also, users belonging to group 3 report the respective radio channel conditions at reportable timings different from those of the groups 1 and 2. Also, users belonging to group 4 report the respective radio channel conditions at reportable timings different from those of groups 1, 2 and 3. The different groups have the same cycle length for reporting the radio channel conditions.

Figure 3:
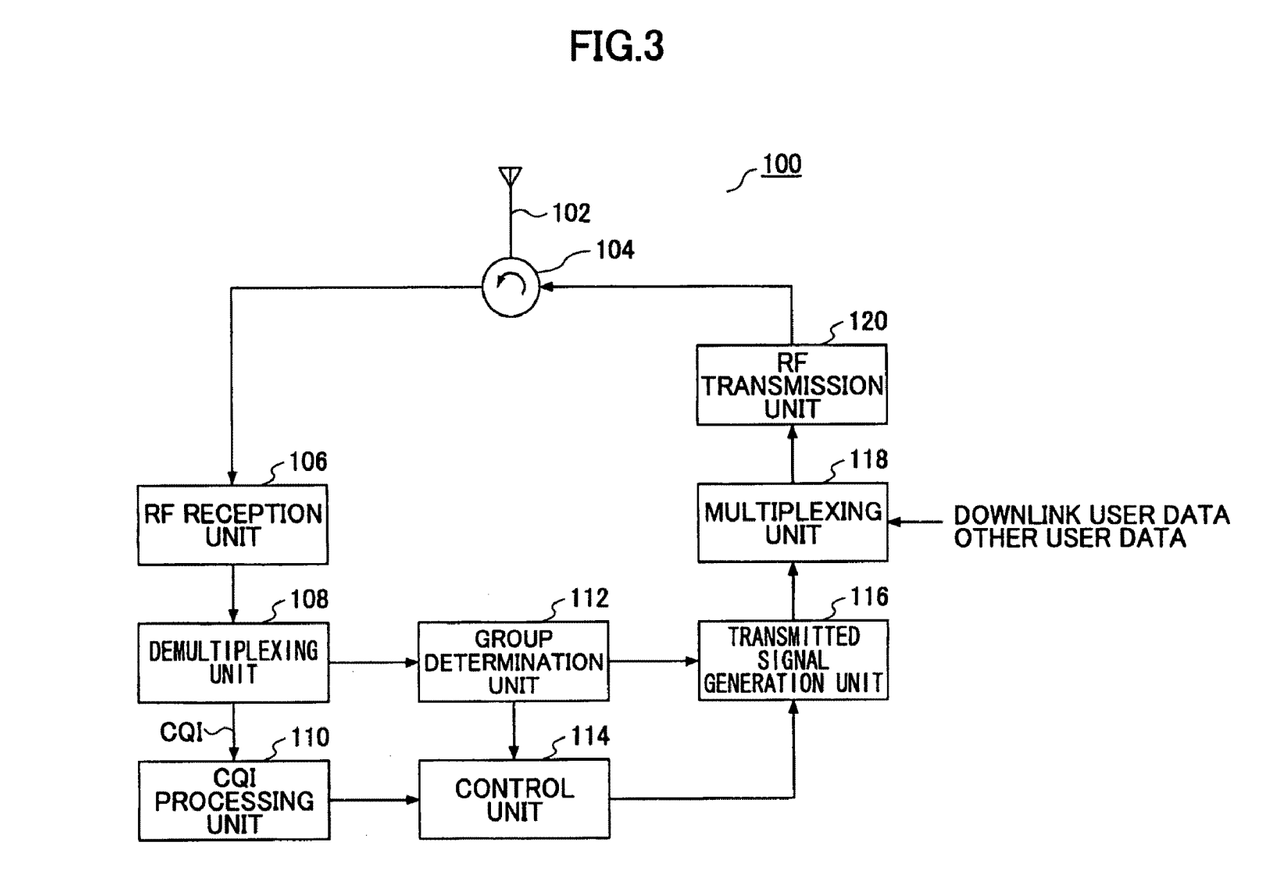
FIG. 3 is a partial block diagram illustrating a base station according to one embodiment of the present invention.

The base station 100 is described in detail with reference to FIG. 3.

The base station 100 includes a transmitter. The transmitter includes an antenna 102, a transmission and reception unit 104 coupled to the antenna 102, a RF reception unit 106 receiving signals from the transmission and reception unit 104, a demultiplexing unit 108 receiving output signals of the RF reception unit 106, a CQI processing unit 110 receiving CQI information from the demultiplexing unit 108, a group determination unit 112 receiving output signals of the demultiplexing unit 108, a control unit 114 receiving output signals of the CQI processing unit 110 and the group determination unit 112, a transmitted signal generation unit 116 receiving output signals of the group determination unit 112 and the control unit 114, a multiplexing unit 118 receiving output signals of the transmitted signal generation unit 116, and a RF transmission unit 120 receiving output signals of the multiplexing unit 118. Output signals of the RF transmission unit 120 are supplied to the transmission and reception unit 104.

The RF reception unit 106 receives data in synchronization with uplink signals from the mobile station 200 and supplies the received data to the demultiplexing unit 108. The received data may include CQI information, uplink user data, other user data and/or control signals, for example.

The demultiplexing unit 108 extracts the CQI information from the received data and supplies the CQI information to the CQI processing unit 110. Also, the demultiplexing unit 108 supplies information for identifying mobile stations 200, such as mobile station IDs, to the group determination unit 112.

The CQI processing unit 110 performs a predetermined operation on the CQI and supplies information indicative of processing results to the control unit 114.

The group determination unit 112 groups the multiple mobile stations 200 based on the supplied information for identifying the mobile stations 200. For example, the group determination unit 112 may group the mobile stations 200 based on the mobile station IDs reported from the mobile stations 200. For example, if the mobile stations 200 are grouped into N groups, for example, based on the reported mobile station IDs, then the group determination unit 112 may implement the grouping based on remainders (modulos) in division of the reported mobile station IDs by the number of groups.

Alternatively, the group determination unit 112 may determine the respective groups of the mobile stations 200 through radio protocol control in calling control.

Alternatively, the group determination unit may determine the respective groups of the mobile stations 200 based on information for identifying the mobile stations 200 assigned by networks.

Then, the group determination unit 112 supplies information indicative of the determined groups to the control unit 114 and the transmitted signal generation unit 116.

The transmitted signal generation unit 116 generates control information for reporting the supplied group indicative information to the corresponding mobile stations 200 and supplies the control information to the multiplexing unit 118. For example, if the groups of the mobile stations 200 are determined through radio protocol control in calling control, the group determination unit 112 may generate control information indicative of the groups.

The control unit 114 controls reception timings depending on the supplied groups of the respective mobile stations 200. For example, the control unit 114 may include a correspondence table indicative of correspondence between the respective groups of the mobile stations 200 and respective timings at which the mobile stations 200 belonging to the respective groups are allowed to report radio channel conditions and control the reception timings based on the correspondence table. Also, the control unit 114 controls transmission of the control information by the transmitted signal generation unit 116.

The multiplexing unit 118 multiplexes control signals with downlink user data and/or other downlink user signals transmitted simultaneously and the resulting signals to the RF transmission unit 120.

The RF transmission unit 120 converts transmitted signals into RF signals and accordingly excites the antenna. As a result, the data can be transmitted.

Figure 4:
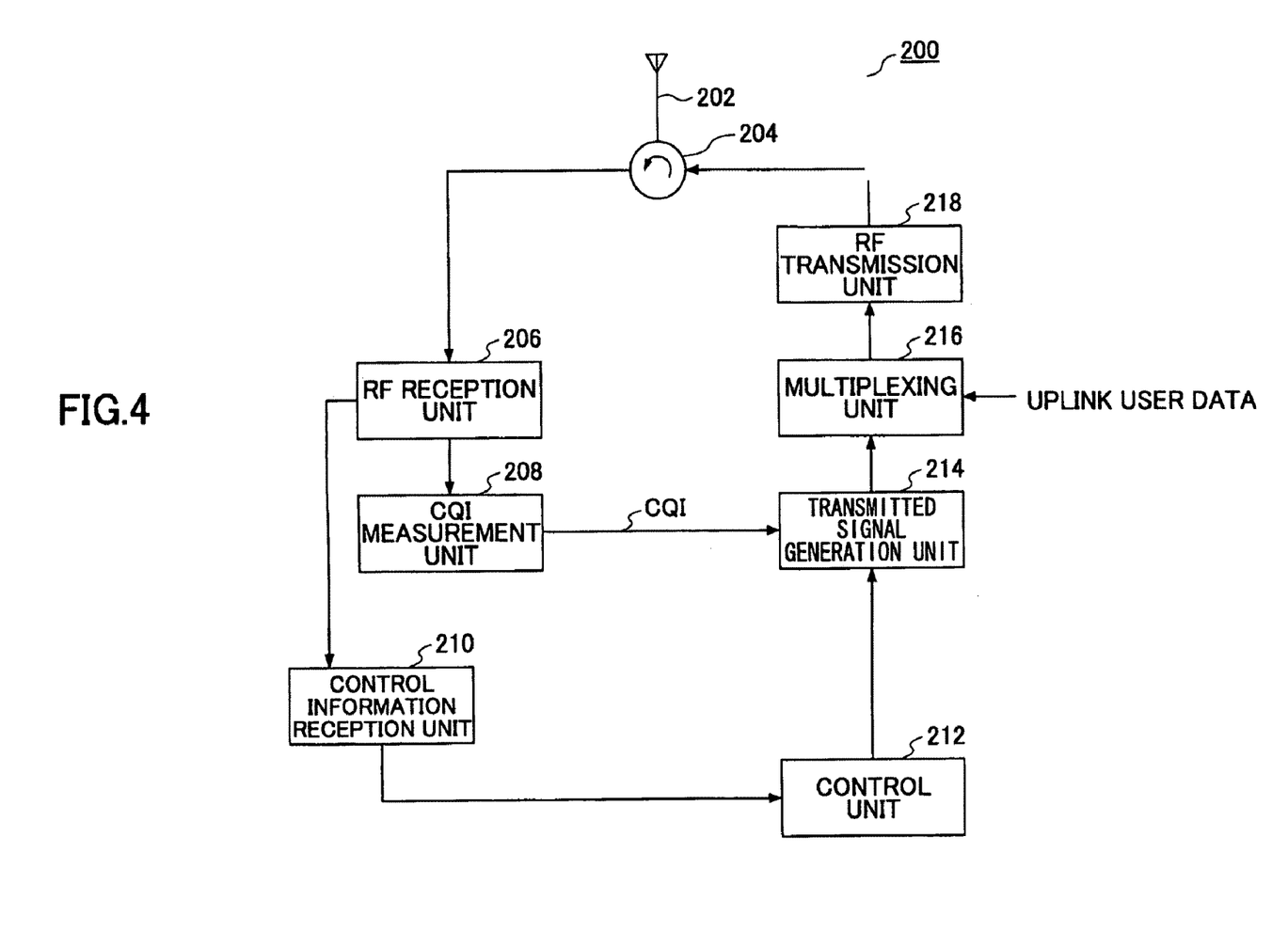
FIG. 4 is a partial block diagram illustrating a mobile station according to one embodiment of the present invention.

Next, the mobile station 200 according to this embodiment is described in detail with reference to FIG. 4.

The mobile station 200 reports information indicative of radio channel conditions at timings corresponding to the associated group based on information indicative of the associated group reported by the base station 100.

The mobile station 200 includes a receiver. The receiver includes an antenna 202, a transmission and reception unit 204 coupled to the antenna 202, a RF reception unit 206 receiving signals received at the transmission and reception unit 204, a CQI measurement unit 208 and a control information reception unit 210 receiving output signals of the RF reception unit 206, a control unit 212 receiving output signals of the control information reception unit 210, a transmitted signal generation unit 214 receiving output signals of the CQI measurement unit 208 and the control unit 212, a multiplexing unit 216 receiving output signals of the transmitted signal generation unit 214, and a RF transmission unit 218 receiving output signals of the multiplexing unit 216. Output signals of the RF transmission unit 218 are supplied to the transmission and reception unit 204.

The RF reception unit 206 receives signals in synchronization with a desired system frequency for reception and supplies received data to the CQI measurement unit 208 and the control information reception unit 210.

The CQI measurement unit 208 evaluates a radio channel condition such as CQI based on a signal received from a presently communicating cell and supplies information indicative of the CQI to the transmitted signal generation unit 214.

The control information reception unit 210 receives control information transmitted from the base station 100, such as information indicative of the determined group, and supplies the control information to the control unit 212.

Based on the supplied group indicative information, the control unit 212 controls reporting of the radio channel condition so that the reporting can be performed at timings corresponding to the associated group. For example, similar to the base station 100, the control unit 210 includes a correspondence table indicative of correspondence between the respective groups of mobile stations 200 and respective timings at which the mobile stations 200 belonging to the respective groups are allowed to report the CQI and controls the transmission timings based on the correspondence table.

Alternatively, by using the same determination method as the base station 100, the control unit 210 may determine the group of that mobile station 200 based on ID assigned to the mobile station 200. For example, if the mobile stations 200 are grouped into N groups, the control unit 210 may determine the associated groups based on remainders (modulos) in division of mobile station IDs by the number of groups. In this case, the number of groups may be predefined in a system or may be reported from the base station 100.

The transmitted signal generation unit 214 generates signals for reporting the supplied radio channel conditions and supplies the signals to the multiplexing unit 216.

The multiplexing unit 126 multiplexes uplink user data with reported CQI values (instantaneous CQIs) and supplies the resulting signals to the RF transmission unit 218.

The RF transmission unit 218 converts the transmitted signals into RF signals and accordingly excites the antenna. As a result, data can be transmitted.

Figure 5:
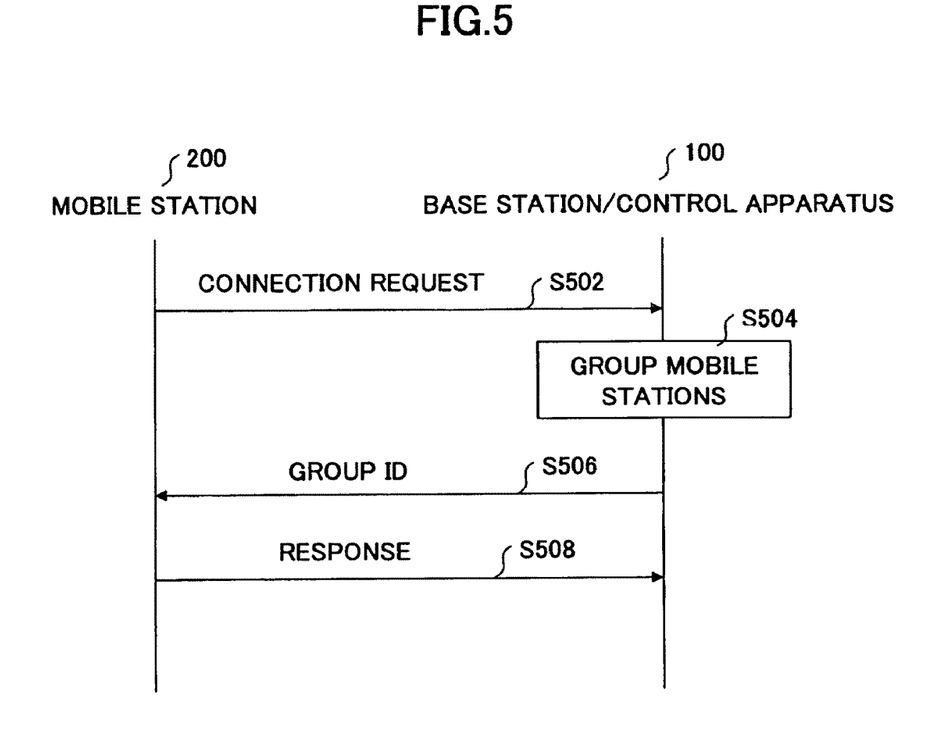
FIG. 5 is a flow diagram illustrating an exemplary operation of a radio communication system according to one embodiment of the present invention.

Next, an exemplary operation of the radio communication system according to this embodiment is described in detail with reference to FIG. 5.

At step S502, the mobile station 200 requests connection to the base station 100 or a control apparatus. For example, the transmitted signal generation unit 214 may generate and transmit a connection request signal.

At step S504, in response to receipt of the connection request signal from the mobile station 200, the base station 100 groups the mobile station 200 through radio protocol control in calling control. Alternatively, the base station 100 may group the mobile station 200 based on information for identifying the mobile station 200 assigned by a network.

Then at step S506, the base station 100 transmits information indicative of the associated group as the group ID to the mobile station 200.

At step S508, in response to receipt of the group ID, the mobile station 200 issues a reception response.

Subsequently, the mobile station 200 reports information indicative of the radio channel condition at timings corresponding to the associated group.

In this embodiment, the mobile station 200 reports the information indicative of the radio channel condition at all the timings corresponding to the associated group. The present invention is not limited to it, and the information may be reported every a predetermined number of the timings corresponding to the associated group.

Figure 6:
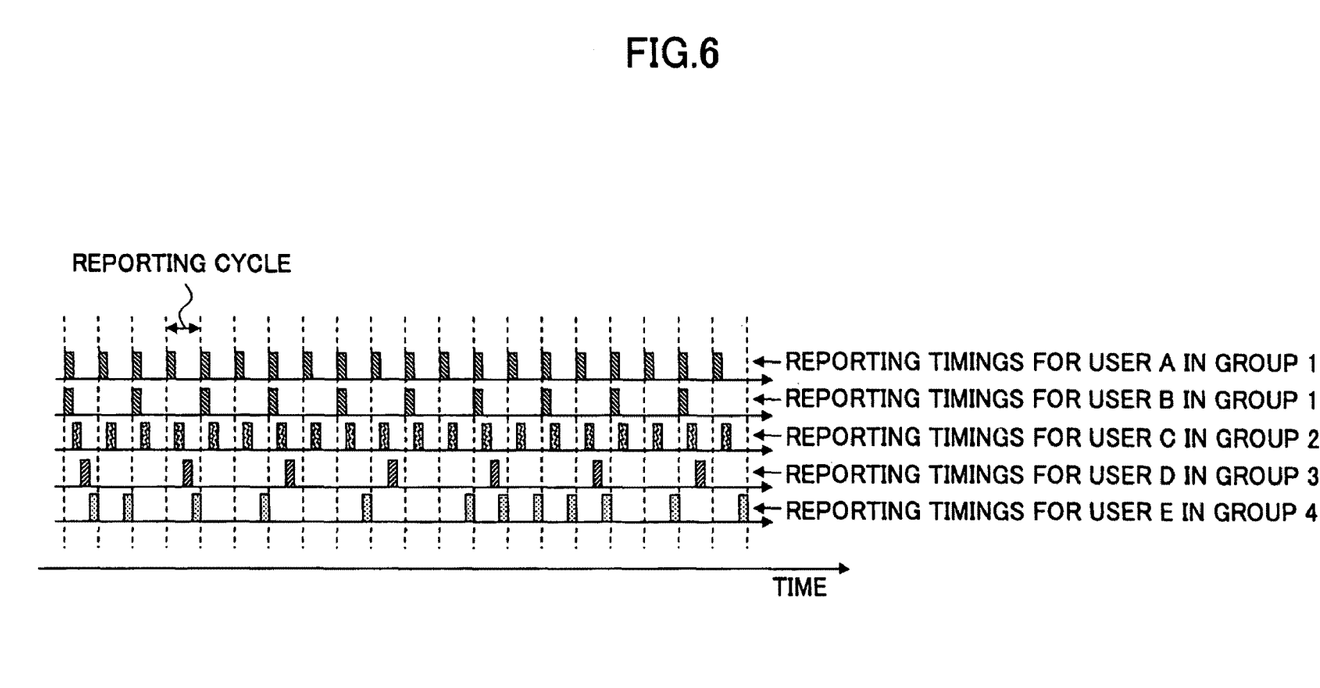
FIG. 6 is a schematic diagram illustrating reporting timings of radio channel conditions according to one embodiment of the present invention.

Exemplary reporting timings for two users A and B belonging to group 1 are described in detail with reference to FIG. 6. While user A belonging to group 1 reports the information indicative of the radio channel condition at all the timings, user B belonging to the same group 1 reports the information indicative of the radio channel condition every two times of the timings. In this manner, different users may have different reporting timings. However, the reporting timings for a certain user are limited to any of the reporting timings for a group associated with that user.

In this embodiment, the control unit 212 of the mobile station 200 controls the reporting timings based on at least one of a service in user's use, QoS of a radio bearer, the capacity of the mobile station 200, traveling speed, average throughput by the current time and average delay. Also, the control unit 212 may control the reporting timings depending on the presence of transmitted data. As a result, the reporting timings may be dynamically adjusted as in user E. In this case, the reporting timings are also limited to the reporting timings for the associated group.

In the above-mentioned embodiments, the reporting timings are controlled to have the same cycle in all the groups. However, the cycle and/or the pattern may be differ for the respective groups.

Figure 7:
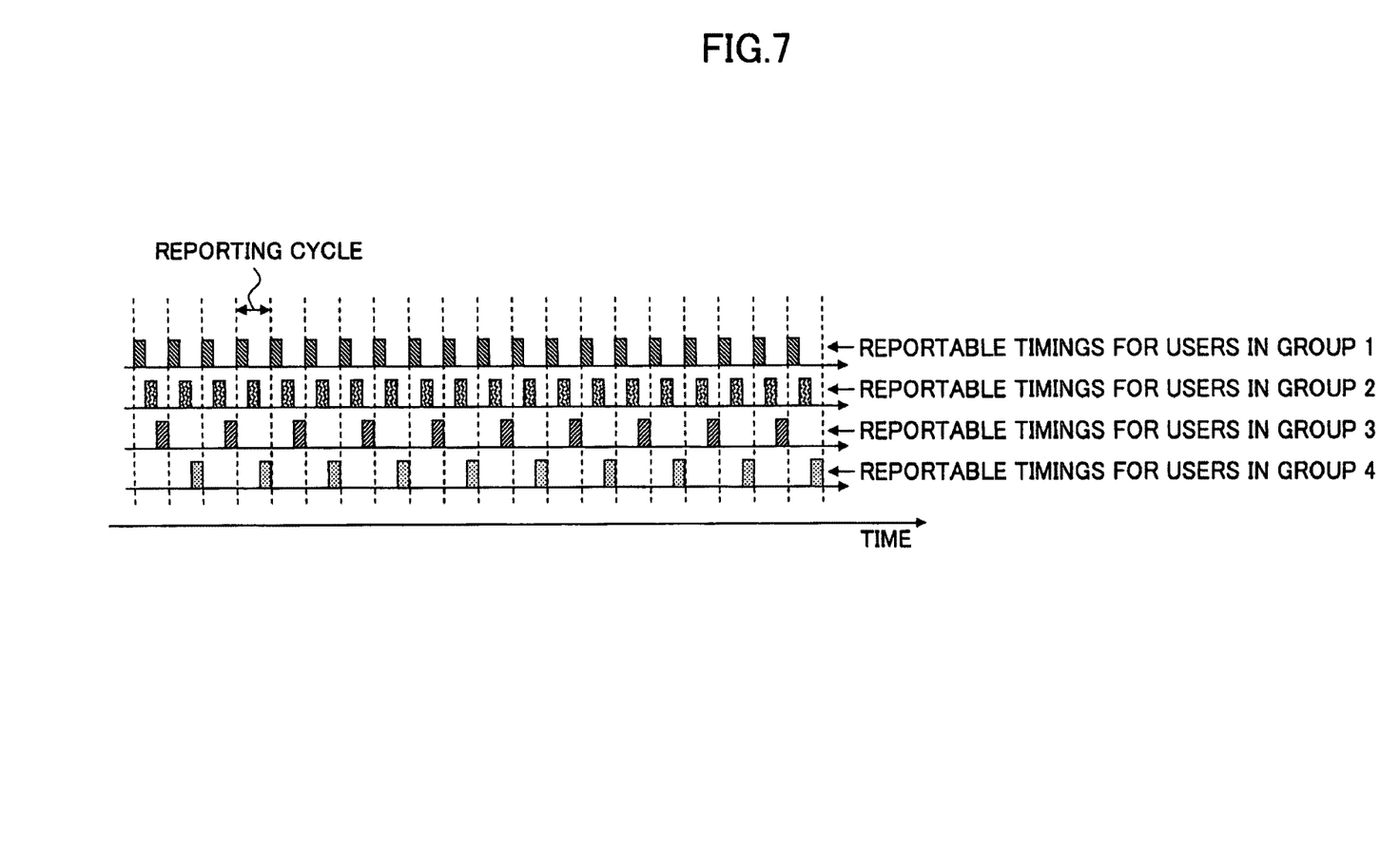
FIG. 7 is a schematic diagram illustrating reporting timings of radio channel conditions according to one embodiment of the present invention.

For example, as illustrated in FIG. 7, the mobile stations belonging to groups 1 and 2 control the reporting timings in the same cycle, while the mobile stations belonging to groups 3 and 4 control the reporting timings in a cycle different from those of groups 1 and 2.

In this case, the control unit 114 in the base station 100 adjusts the reporting timings depending on services and/or QoS of radio bearers and reports them to the mobile station 200. Alternatively, the control unit 114 may adjust the reporting timings depending on average throughput, average delay, average CQI and/or traveling speed.

Also, if these factors have varied, the group of the mobile station 200 may be changed, and information indicative of the changed group may be reported to the mobile station 200 to adjust the reporting timings.

Next, a radio communication system according to another embodiment of the present invention is described.

The radio communication system of this embodiment differs from the above-mentioned embodiments in that it includes mobile stations 200 with a different arrangement.

Figure 8:
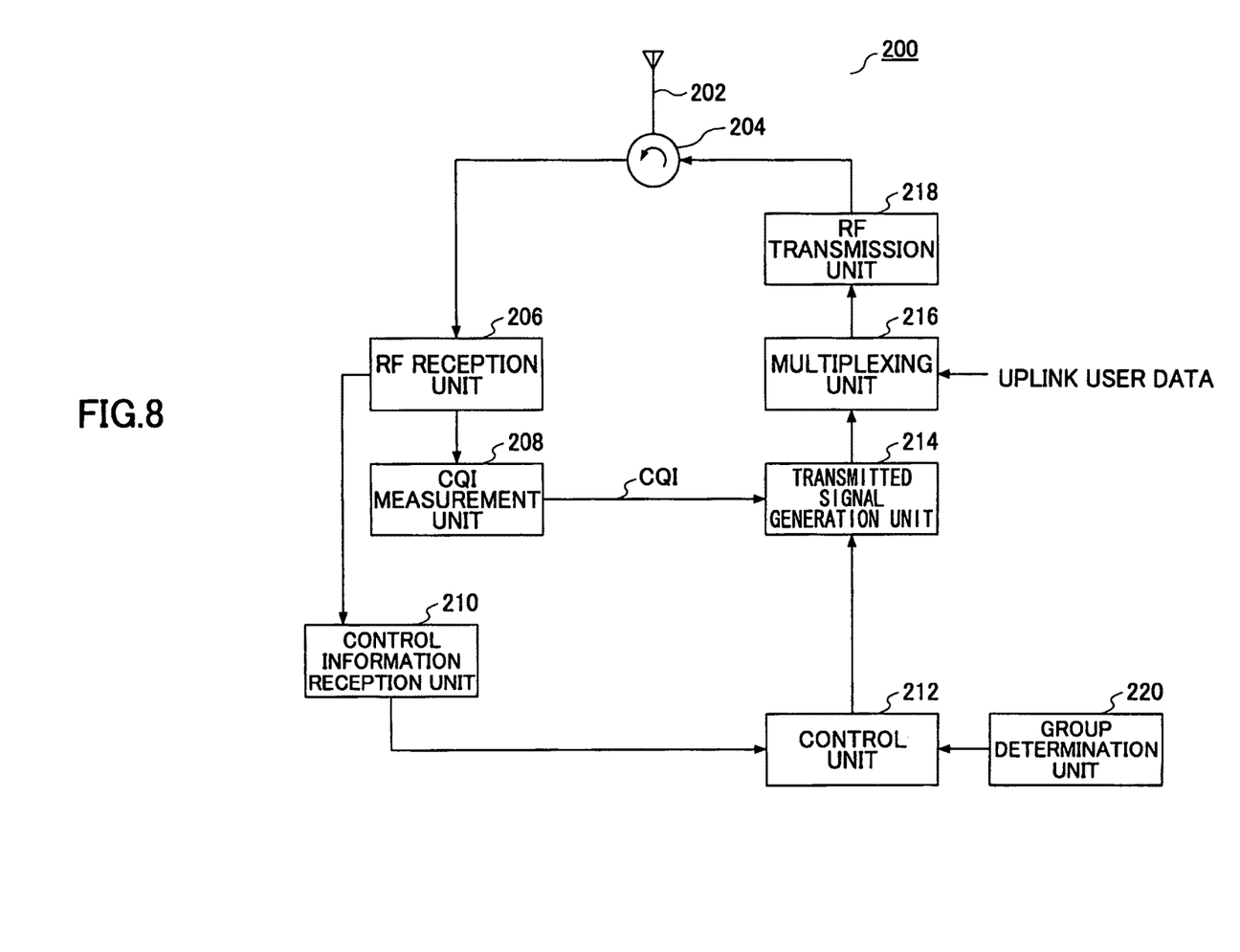
FIG. 8 is a partial block diagram illustrating a mobile station according to one embodiment of the present invention.

In this embodiment, as illustrated in FIG. 8, a mobile station 200 includes a group determination unit 220 coupled to the control unit 212 in addition to the components in the mobile station 200 described with reference to FIG. 4.

The group determination unit 220 determines a group belonging to that mobile station 200 based on information broadcast from the base station 100 and supplies information indicative of that group to the control unit 212.

Figure 9A:
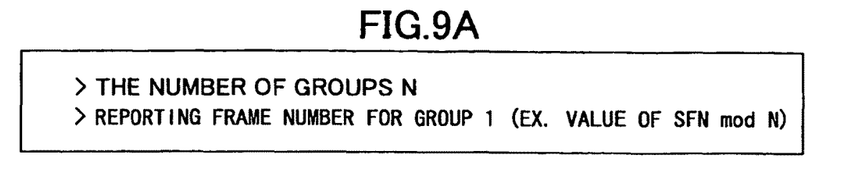
FIG. 9A is a schematic diagram illustrating an exemplary structure of broadcast information.

If the base station 100 broadcasts the reporting frame number for the first group, for example, the reporting frame number for group 1 to synchronize with the number of groups N, as illustrated in FIG. 9A, the group determination unit 220 determines a group of the mobile station 200 based on the number of groups N and the reporting frame number. For example, the reporting frame number may be the remainder (modulo) in SFN mod N, that is, in division of the system frame number (SFN) by the number of groups N.

In this case, the same operation is also performed in the group determination unit 112 in the base station 100 in order to determine the group of the mobile station 200.

Figure 9B:
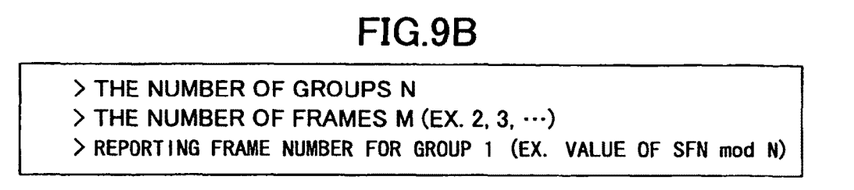
FIG. 9B is a schematic diagram illustrating an exemplary structure of broadcast information.

Alternatively, if the base station 100 broadcasts the number of groups N, the number of frames between groups, for example, 2, 3, . . . , and the reporting frame number for a certain group such as group 1, as illustrated in FIG. 9B, the group determination unit 220 determines a group of that mobile station 200 based on the number of groups N, the number of frames M between the groups and the reporting frame number for the group broadcast by the base station 100. For example, the reporting frame number may be the remainder (modulo) in SFN mod T, that is, in division of the system frame number (SFN) by the reporting cycle T. In this manner, if there is an offset of a few frames between the groups, the offset can be specified as a parameter.

In this case, the same operation is performed in the group determination unit 112 in the base station 100 in order to determine a group associated with the mobile station 200.

Figure 9C:
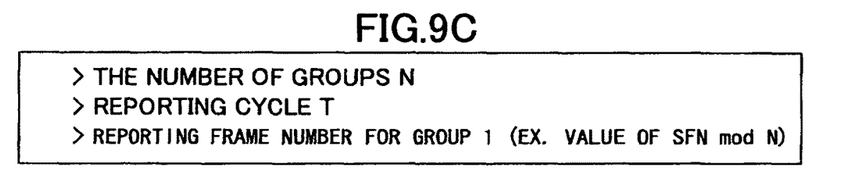
FIG. 9C is a schematic diagram illustrating an exemplary structure of broadcast information.

Alternatively, if the base station 100 broadcasts the number of groups N, the reporting cycle T and the reporting frame number for a certain group such as group 1, as illustrated in FIG. 9C, the group determination unit 220 determines a group of the mobile station 200 based on the number of groups N, the reporting cycle T and the reporting frame number for the group broadcast by the base station 100. In this case, assignment of the reporting timings for the groups within the cycle T must be specified in advance.

In this case, the group determination unit 112 in the base station 100 also performs the same operation to determine the group associated with the mobile station 200.

Figure 9D:
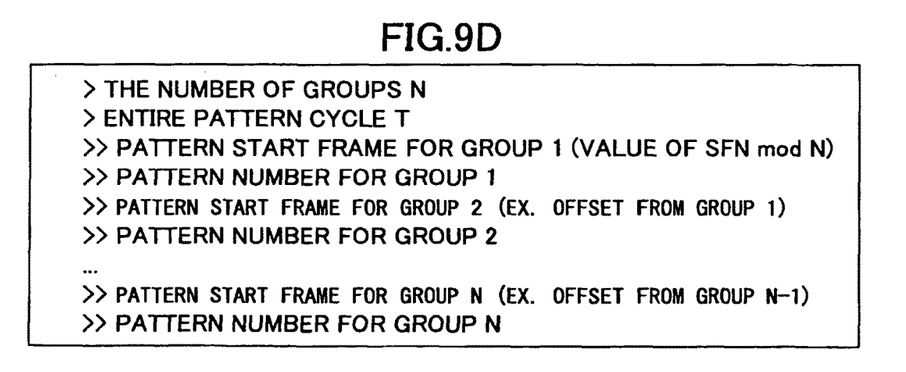
FIG. 9D is a schematic diagram illustrating an exemplary structure of broadcast information.

Alternatively, if the base station 100 broadcasts the number of groups N, the entire pattern cycle T, the pattern start frame for group 1, the pattern number for group 1, the pattern start frame for group 2, the pattern number for group 2, . . . , the pattern start frame for group N and the pattern number for group N, as illustrated in FIG. 9D, the group determination unit 220 determines a group of that mobile station 200 based on the number of groups N, the entire pattern cycle T, the pattern start frames for the groups and the pattern numbers for the groups broadcast by the base station 100. For example, the pattern start frame for group 1 may be the remainder (modulo) in SFN mod T, that is, in division of the system frame number (SFN) by the reporting cycle T, and the pattern start frame for group 2 and the other subsequent groups may be offsets from the respective previous groups.

In this manner, the reporting timing patterns for the groups can be flexibly set.

In this case, the same operations are performed in the group determination unit 112 in the base station 100 in order to determine the group associated with the mobile stations 200.

Figure 9E:
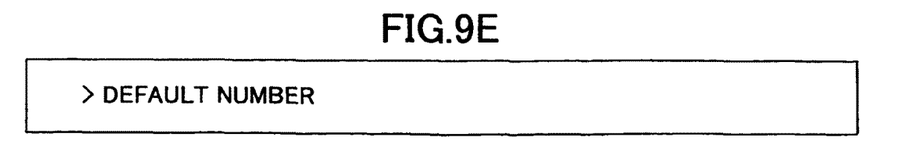
FIG. 9E is a schematic diagram illustrating an exemplary structure of broadcast information.

Alternatively, if the base station 100 broadcasts a default number, as illustrated in FIG. 9E, the group determination unit 220 determines a group of that mobile station 200 based on the reported default number. In this manner, the amount of the broadcast information can be reduced.

In this case, the same operations are performed in the group determination unit 112 in the base station 100 in order to determine the group of the mobile station 200.

In the above-mentioned embodiments, the radio channel condition such as the CQI is reported. However, the present invention is not limited to it and can be similarly applied to reporting of uplink buffer status.

This international patent application is based on Japanese Priority Application No. 2006-077819 filed on Mar. 20, 2006, the entire contents of which are hereby incorporated by reference.

INDUSTRIAL APPLICABILITY

A base station, a mobile station and a radio channel condition reporting method according to the present invention can be applied to radio communication systems.

The invention claimed is:

1. A base station, comprising:
   a broadcast information generation unit generating broadcast information for determining a group associated with a mobile station;
   a broadcast information transmitting unit transmitting the generated broadcast information;
   a group determination unit grouping mobile stations residing within a cell;
   a radio channel condition reception unit receiving information indicative of a radio channel condition transmitted from the grouped mobile station at a transmission timing of the radio channel condition corresponding to the group associated with the mobile station; and
   a frequency scheduling unit assigning a frequency band to a user based on the received information,
   wherein the broadcast information generation unit generates the broadcast information including a number of groups,
   the group determination unit determines the group associated with the mobile station based on the broadcast information transmitted by the broadcast information transmitting unit, and
   the mobile station determines the group associated with the mobile station based on the broadcast information transmitted by the base station.

2. The base station as claimed in claim 1, wherein the radio channel condition reception unit receives the information indicative of the radio channel conditions transmitted by the mobile stations at timings different for respective groups, the timings resulting from time division of a common radio resource among the groups.

3. The base station as claimed in claim 1, wherein the broadcast information generation unit generates the broadcast information including at least one of a a reporting timing of a radio channel condition for a first group, a pattern of reporting timings of respective radio channel conditions for the groups and information for specifying the pattern of reporting timings of radio channel conditions.

4. A mobile station for reporting a radio channel condition to a base station, comprising:
   a broadcast information reception unit receiving broadcast information from the base station;
   a radio channel condition measurement unit evaluating a radio channel condition;
   a group determination unit determining a group associated with the mobile station based on a number of groups included in the received broadcast; and
   a radio channel condition transmission unit transmitting information indicative of the evaluated radio channel condition at a transmission timing of the radio channel condition corresponding to the associated group,
   wherein the base station generates the broadcast information for determining the group associated with the mobile station, transmitting the broadcast information, groups mobile stations residing within a cell based on the transmitted broadcast information, receives information indicative of the radio channel condition transmitted by the mobile station at the transmission timing of the radio channel condition corresponding to the associated group, and assigns a frequency band to a user based on the received information.

5. The mobile station as claimed in claim 4, wherein the group determination unit determines the associated group based on at least one of a reporting timing of a radio channel condition for a first group, a pattern of reporting timings of respective radio channel conditions for the groups and information for specifying the pattern of reporting timings of radio channel conditions included in the received broadcast information.

6. The mobile station as claimed in claim 4, wherein the radio channel condition transmission unit transmits the information indicative of the radio channel condition at a timing different for respective groups, the timing resulting from time division of a common radio resource among the groups.

7. A radio channel condition reporting method for use in a mobile station of reporting a radio channel condition, the method comprising the steps of:
   receiving broadcast information from the base station;
   evaluating a radio channel condition;
   determining a group associated with the mobile station based on a number of groups included in the received broadcast information; and
   transmitting information indicative of the evaluated radio channel condition at a transmission timing of the radio channel condition corresponding to the associated group,
   wherein the base station generates the broadcast information for determining the group associated with the mobile station, transmitting the broadcast information, groups mobile stations residing within a cell based on the transmitted broadcast information, receives information indicative of the radio channel condition transmitted by the mobile station at the transmission timing of the radio channel condition corresponding to the associated group, and assigns a frequency band to a user based on the received information.

* * * * *